United States Patent
Knox-Holmes

(10) Patent No.: US 10,370,272 B2
(45) Date of Patent: Aug. 6, 2019

(54) SUBSEA DEOXYGENATION IN A WATER INJECTION PROCESS PLANT

(71) Applicant: Cameron Solutions, Inc., Houston, TX (US)

(72) Inventor: Brent Knox-Holmes, East Farndon (GB)

(73) Assignee: Cameron Solutions, Inc., Houston, TX (US)

(*) Notice: Subject to any disclaimer, the term of this patent is extended or adjusted under 35 U.S.C. 154(b) by 73 days.

(21) Appl. No.: 15/058,923

(22) Filed: Mar. 2, 2016

(65) Prior Publication Data
US 2017/0253506 A1    Sep. 7, 2017

(51) Int. Cl.
*C02F 1/70*    (2006.01)
*C02F 1/20*    (2006.01)
(Continued)

(52) U.S. Cl.
CPC ............... *C02F 1/70* (2013.01); *B01D 19/00* (2013.01); *B01D 19/0005* (2013.01); *C02F 1/20* (2013.01); *C02F 1/441* (2013.01); *C02F 1/442* (2013.01); *C02F 1/444* (2013.01); *B01D 61/022* (2013.01); *B01D 61/025* (2013.01); *B01D 61/027* (2013.01); *B01D 61/145* (2013.01); *B01D 61/147* (2013.01); *B01D 2311/04* (2013.01); *B01D 2311/06* (2013.01); *B01D 2311/2696* (2013.01); *C02F 1/4674* (2013.01); *C02F 1/725* (2013.01); *C02F 2103/08* (2013.01); *C02F 2201/006* (2013.01); *C02F 2303/20* (2013.01);
(Continued)

(58) Field of Classification Search
None
See application file for complete search history.

(56) References Cited

U.S. PATENT DOCUMENTS 4,556,492 A * 12/1985 Dickerson ............... C02F 1/20
                                                210/668
4,851,130 A *  7/1989 May ....................... C02F 1/20
                                                210/750

(Continued)

FOREIGN PATENT DOCUMENTS

CN    103899290    7/2014
EP    0082630      6/1983
(Continued)

OTHER PUBLICATIONS

Saipem, "Springs: Subsea seawater treatment for injection" A sulphate removal system to avoid deposits and eservoir souring, Springs Jun. 2014.

*Primary Examiner* — Jonathan M Peo
(74) *Attorney, Agent, or Firm* — Hauptman Ham, LLP

(57) ABSTRACT

A water injection process plant includes a catalytic deoxygenation unit located subsea that makes use of a reducing agent sent from topsides in liquid form. The catalyst is preferably a palladium catalyst or its equivalent. The reducing agent is an oxygen scavenger such as but not limited to hydrazine, carbohydrazide, sodium erythorbate, methyl ethyl ketoxime ("MEKO"), hydroquinone, diethylhydroxylamine ("DEHA"), formic acid (methanoic acid). A chemical umbilical can be used to deliver the reducing agent to a mixer located upstream of the deoxygenation unit, where the agent is mixed with seawater containing oxygen.

19 Claims, 6 Drawing Sheets

(51) Int. Cl.
*B01D 19/00* (2006.01)
*E21B 43/20* (2006.01)
*C02F 1/44* (2006.01)
*B01D 61/02* (2006.01)
*B01D 61/14* (2006.01)
*C02F 103/08* (2006.01)
*C02F 1/467* (2006.01)
*C02F 1/72* (2006.01)

(52) U.S. Cl.
CPC .......... *C02F 2303/24* (2013.01); *E21B 43/20* (2013.01); *Y02A 20/131* (2018.01)

(56) References Cited

U.S. PATENT DOCUMENTS

| | | |
|---|---|---|
| 5,500,185 A | 3/1996 | Cutler et al. |
| 2013/0233786 A1* | 9/2013 | Posa .................... E21B 21/065 210/259 |
| 2013/0264064 A1* | 10/2013 | Lunde .................... C02F 1/686 166/347 |
| 2014/0054218 A1 | 2/2014 | Sprenkel et al. |

FOREIGN PATENT DOCUMENTS

| | | | |
|---|---|---|---|
| EP | 0387076 | 9/1990 | |
| NO | WO 2012026827 A1 * | 3/2012 | ............. B01D 61/02 |
| WO | 2012/026827 | 3/2012 | |

* cited by examiner

*Fig. 5* (*PRIOR ART*)

SUBSEA DEOXYGENATION IN A WATER INJECTION PROCESS PLANT

BACKGROUND

This invention relates to equipment, systems, and methods used to deoxygenate seawater. More specifically, the invention relates to a subsea catalytic deoxygenation unit in a subsea water injection process plant.

Current seawater injection process plants include topsides treatment steps, with equipment for each step placed on a platform (see FIG. 1). The treatment steps include seawater filtration and biofouling control by way of chemical additions. The filtration takes place at mesh sizes ranging from coarse strainers (to exclude fish and sand) to reverse osmosis membranes (to exclude monovalent ions). The chemical additions include in situ generated hypochlorite (electrochlorination). A deoxygenation or deaeration step is then added topsides so all gases are removed from the seawater.

Some seawater injection process plants are being located subsea (see FIG. 2). However, deoxygenation or deaeration, if used, must occur topsides.

The deaeration equipment used topsides relies on mass transfer processes. The most common of these processes is vacuum deaeration. This process cannot be implemented subsea due to the hydrostatic head above the equipment (e.g. 3000 m of water).

The deoxygenation equipment can be a catalyst bed-based seawater deoxygenation unit to remove dissolved oxygen from seawater by reacting it with hydrogen (see e.g. FIGS. 3-5 and US 2014/0054218 A1 hereby incorporated by reference). This reaction occurs on the open areas of the catalyst bed.

Removal of oxygen from seawater has value to a well operator because seawater with oxygen is highly corrosive. If a well operator wants to inject seawater that has not been deoxygenated, the operator needs to use pipework or tubulars made of an expensive corrosion resistant alloy or lined carbon steel. Even lined carbon steel is not perfect. Any tools put into the well to service it can damage a polymer lining or coating, leading to carbon steel corrosion.

Seawater without oxygen—for example, having an oxygen content no more than about 20 to 50 parts per billion—is relatively benign. Therefore, the pipework conveying the injection water to the reservoir can be made of low cost carbon steel.

SUMMARY

A preferred embodiment of a subsea water injection process plant includes a catalytic deoxygenation unit located subsea that makes use of a reducing agent sent from topsides in liquid form. The catalyst is preferably a palladium catalyst or its equivalent. The reducing agent is an oxygen scavenger such as but not limited to hydrazine, carbohydrazide, sodium erythorbate, methyl ethyl ketoxime ("MEKO"), hydroquinone, diethylhydroxylamine ("DEHA"), formic acid (methanoic acid). A chemical umbilical can be used to deliver the reducing agent to a mixer located upstream of the deoxygenation unit, where the agent is mixed with seawater containing oxygen. Hydrogen could be used as the reducing agent but is not preferable because of the practical difficulties of producing it subsea or delivering it subsea.

ELEMENTS AND ELEMENT NUMBERING USED IN THE DRAWINGS AND THE DETAILED DESCRIPTION

Figure 1:
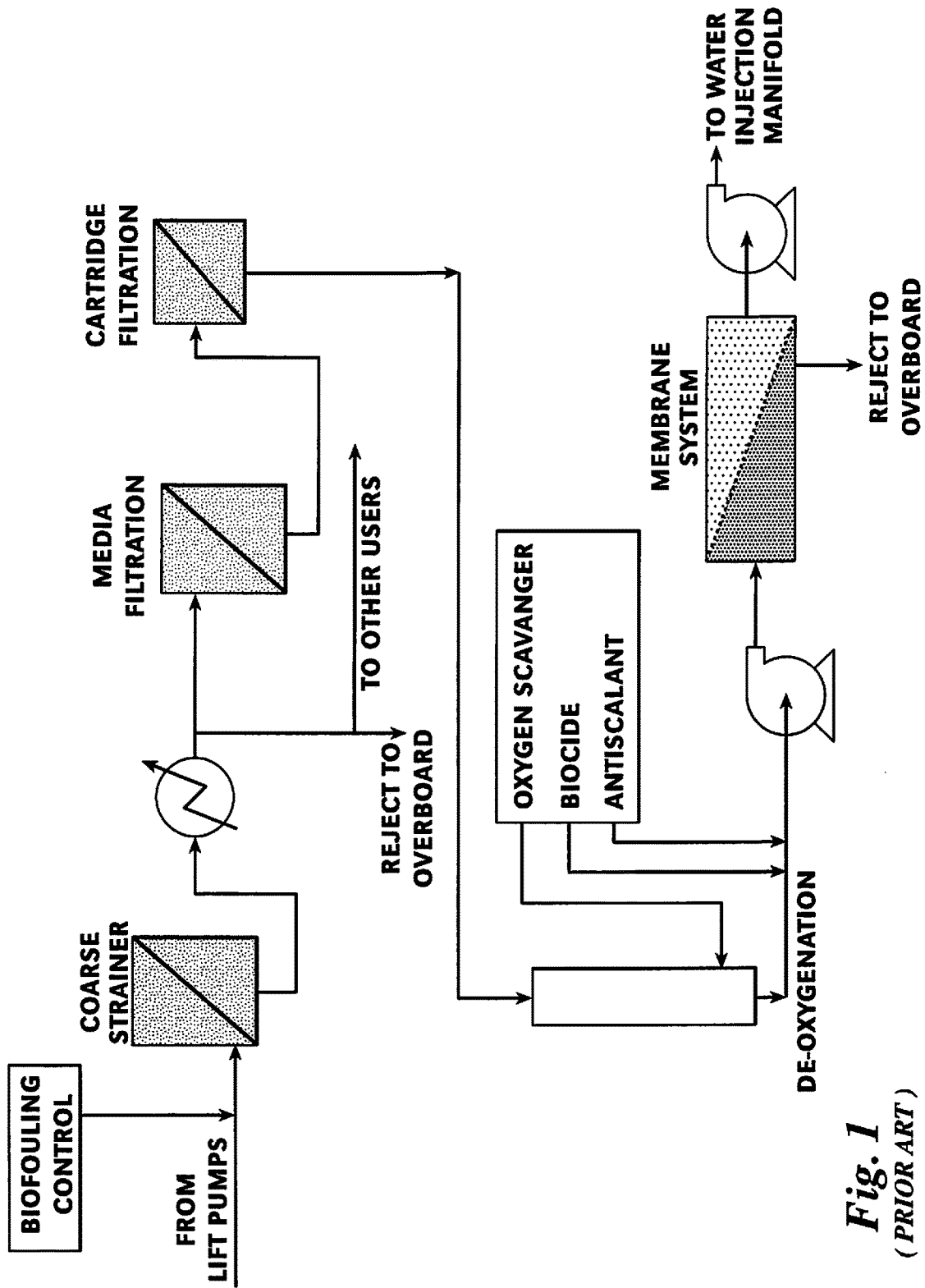
FIG. 1 is a schematic of a prior art topsides water injection process plant.
Figure 2:
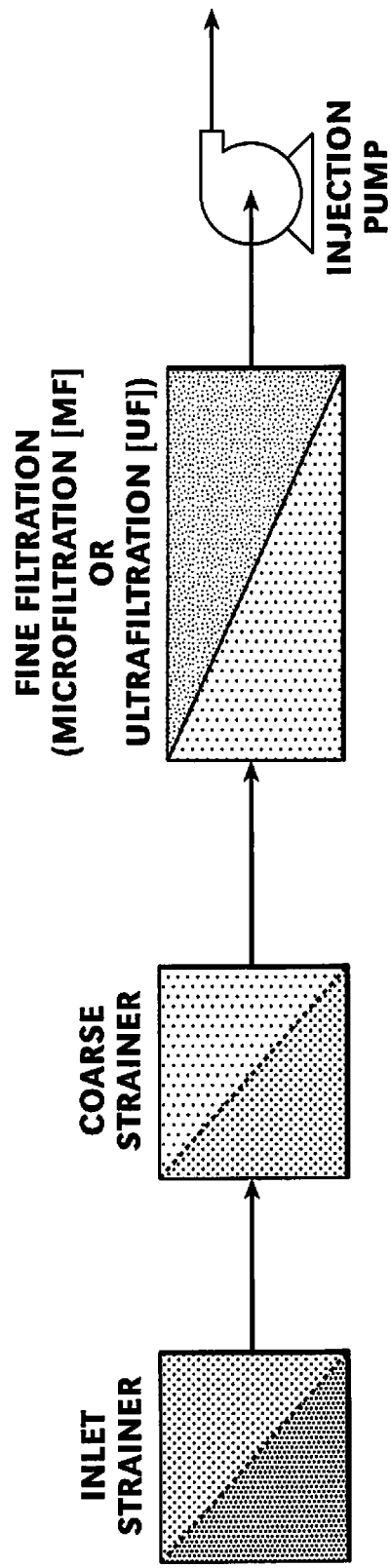
FIG. 2 is a schematic of a subsea water injection process plant that does not deoxygenate the seawater.
Figure 3:
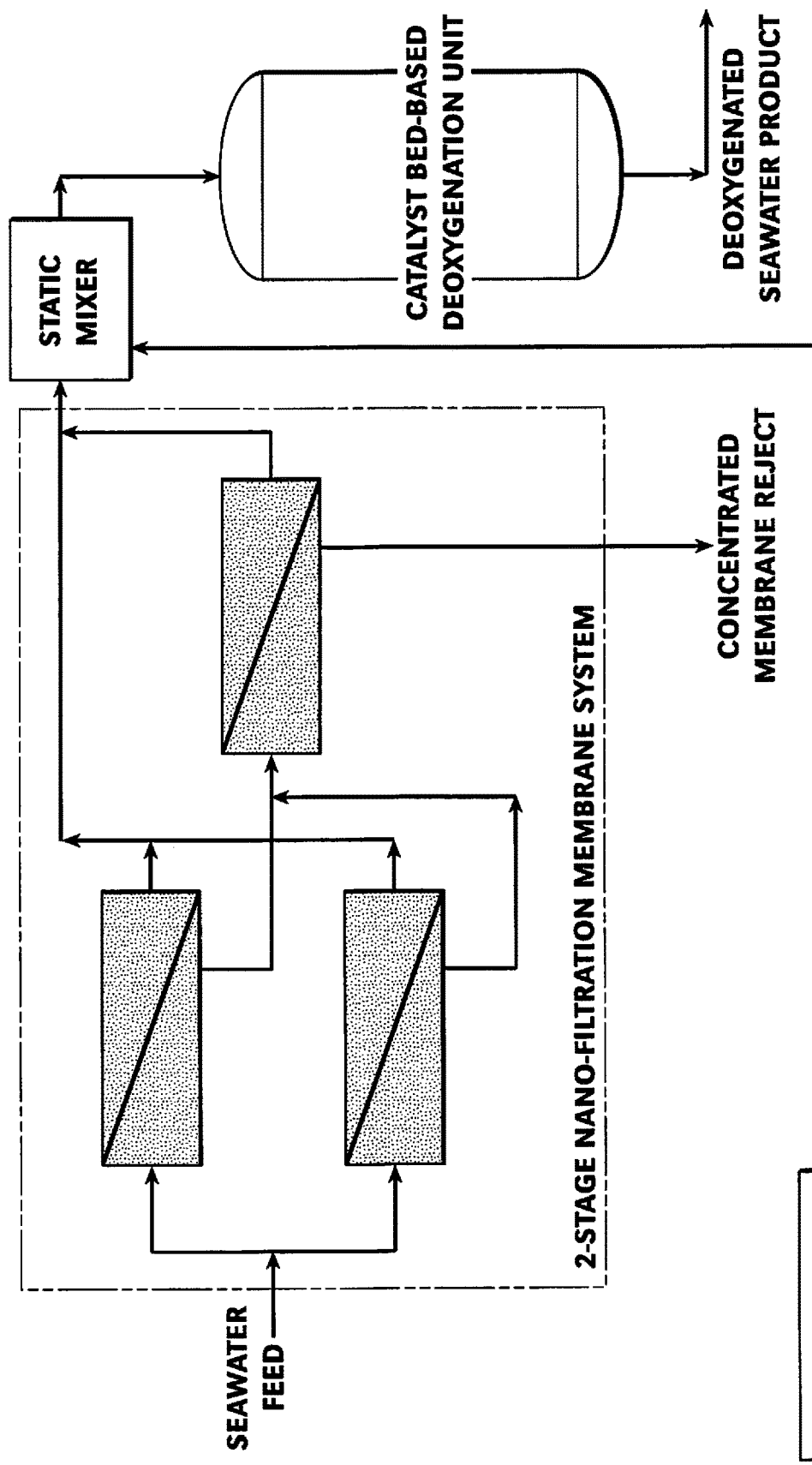
FIG. 3 is a schematic of a prior art topsides catalytic bed-based deoxygenation unit that uses two-stage nanofiltration membrane system upstream of the unit.
Figure 4:
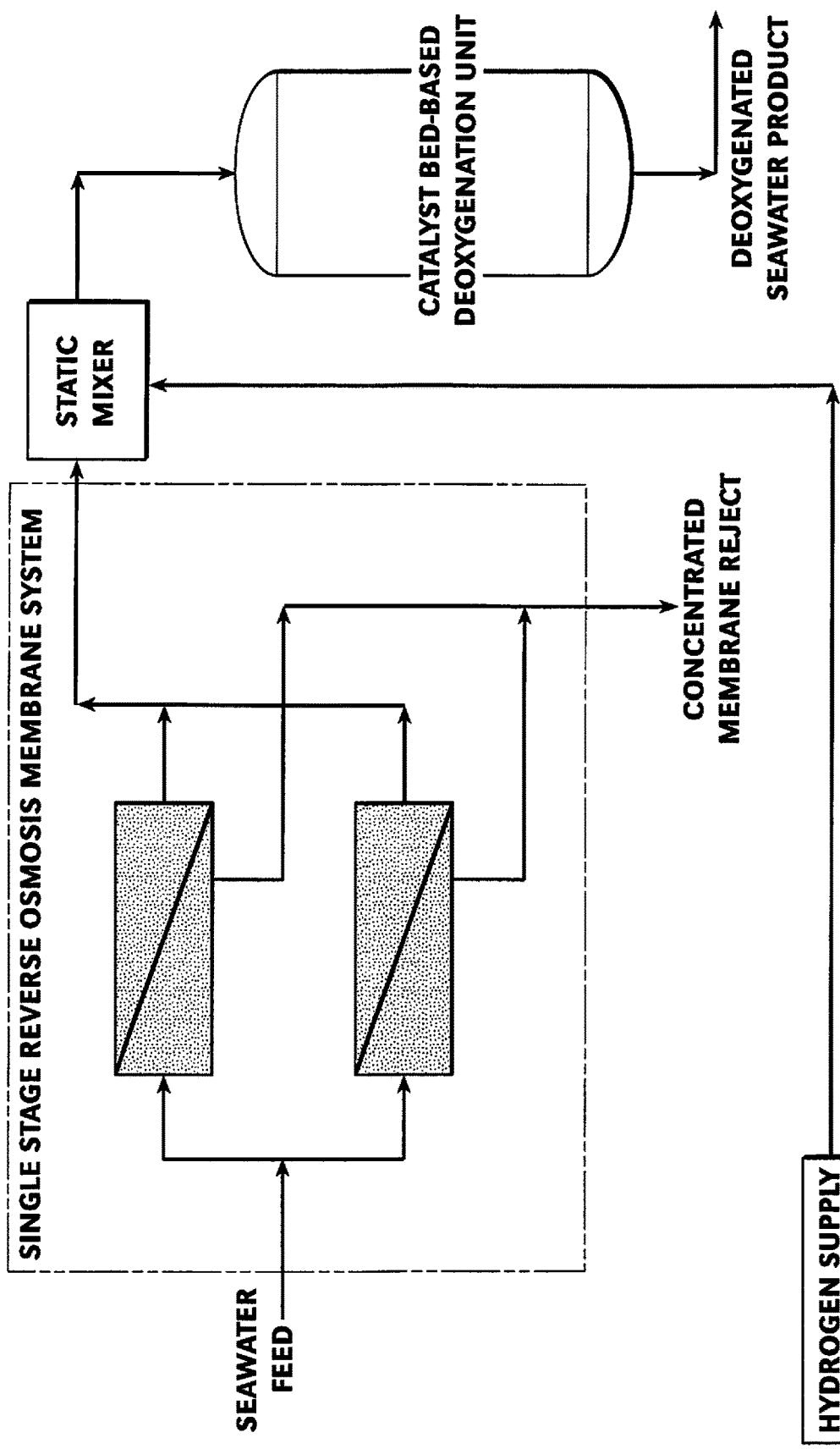
FIG. 4 is a schematic of a prior art topsides catalytic bed-based deoxygenation unit that uses a single stage reverse osmosis membrane system upstream of the unit.
Figure 5:
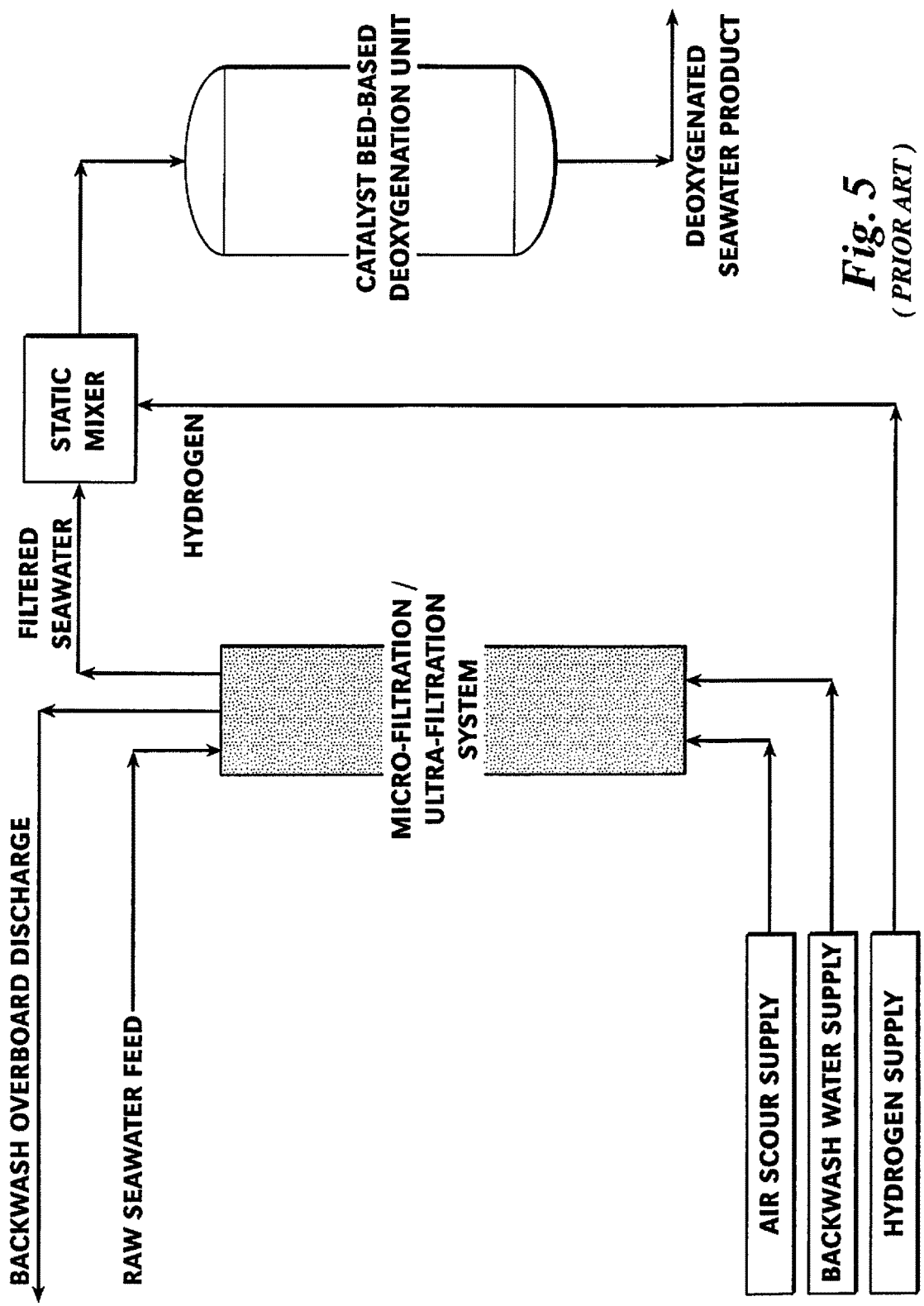
FIG. 5 is a schematic of a prior art topsides catalytic bed-based deoxygenation unit that uses a single stage microfiltration or ultrafiltration membrane system upstream of the unit.

10 Subsea deoxygenation system
15 Raw (untreated, unfiltered) seawater stream
20 Coarse strainer
30 Biofouling control (chemical dosing) means
40 Filtration system
41 Fine filtration means
43 Sulfate ion removal means
45 Salinity reduction means
50 Catalytic deoxygenation unit
51 Static mixer
55 Chemical umbilical
60 Reducing agent
65 Deoxygenated seawater stream
70 Injection pump

DETAILED DESCRIPTION OF THE PREFERRED EMBODIMENTS

Unlike the mass transfer processes used to deaerate or deoxygenate seawater, catalytic deoxygenation can achieve the required low oxygen concentration without the need for additional oxygen scavenging chemicals. More importantly, catalytic deoxygenation can operate at subsea ambient pressures whereas mass transfer processes cannot. However, the hydrogen gas needed for a catalytic deoxygenation unit located topsides is not practical to make subsea or deliver to a unit located subsea.

Deoxygenation according to this invention takes place entirely subsea. The process used includes the steps of delivering from topsides to subsea a reducing agent in liquid form; mixing the reducing agent with a seawater stream containing oxygen; and deoxygenating the mixture subsea using a catalyst bed-based deoxygenation unit.

Figure 6:
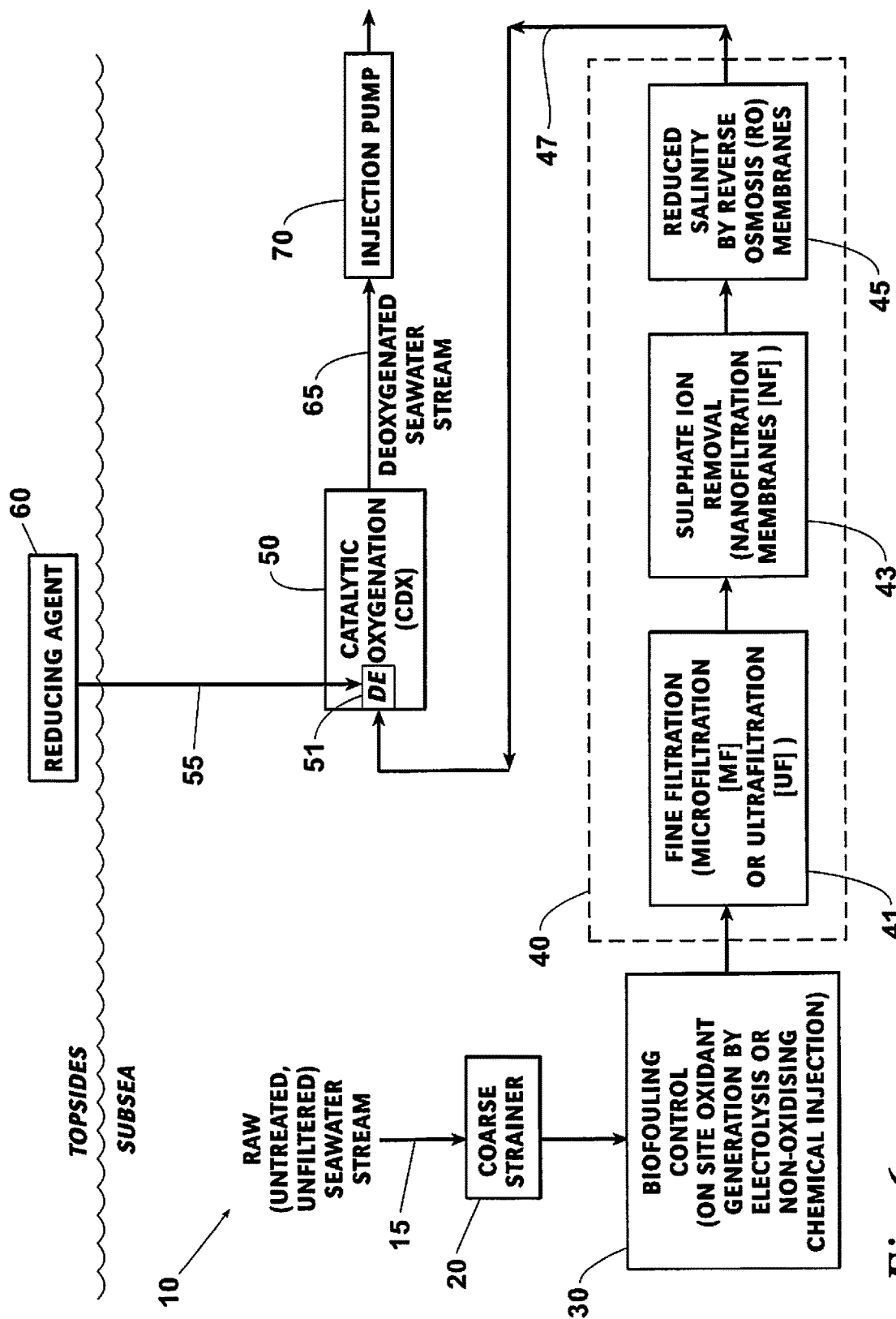
FIG. 6 is a schematic of a preferred embodiment of a subsea deoxygenation process train or system made according to this invention. The catalytic deoxygenation unit is located subsea and makes use of a liquid reducing agent that is sent to the unit via a chemical umbilical from topsides.

Referring now to FIG. 6, a preferred embodiment of a subsea deoxygenation system 10 receives a raw (untreated, unfiltered) seawater stream 15 and passes the stream 15 through a coarse strainer 20, biofouling control means 30 such as in situ oxidant generation by electrolysis or non-oxidizing chemical injection, a filtration system 40, and a catalytic deoxygenation unit 50. The arrangement of this equipment can change based upon application-specific requirements. For example, the biofouling control means 30 can be placed ahead of the strainer 20 or the filtration system 40 (or a portion of it) can be located downstream of the catalytic deoxygenation unit 50.

The unit 50 can be arranged as a compact subsea unit housed in a flooded housing (not shown). A deoxygenated seawater stream 65 exits the unit 50 and enters an injection pump 70.

The catalyst used in unit 50 is preferably a palladium catalyst or its equivalent. One or more AUV- or ROV-retrievable canisters containing the catalyst could be used.

The reducing agent 60 is an oxygen scavenger in liquid form such as but not limited to hydrazine, carbohydrazide, sodium erythorbate, methyl ethyl ketoxime ("MEKO"), hydroquinone, diethylhydroxylamine ("DEHA"), and formic acid (methanoic acid). Hydrogen could theoretically be used as a reducing agent subsea, as it is used topsides, however due to the difficulties of either making it subsea or transporting it from the surface to the seabed, the above liquid reducing agents are preferred. The reducing agent 60 is sent to the unit 50 via a chemical umbilical 55 from topsides.

A static mixer 51 blends the reducing agent 60 with an outlet or permeate stream 47 of the filtration system 40. The filtration system 40 can include fine filtration means 41 such as a micro- or ultrafiltration system, sulfate ion removal means 43 such as a nanofiltration membrane system, and reduced salinity means 45 such as a reverse osmosis membrane system. The catalytic deoxygenation unit 50 could be placed upstream of the filtration system 40 or within the filtration system 40 (e.g. between the sulfate ion removal means 43 and the reduced salinity means 45).

While preferred embodiments of a subsea deoxygenation system have been described in detail, a person of ordinary skill in the art understands that certain changes can be made in the arrangement of and types of components used in the process without departing from the scope of the attached claims.

What is claimed:

1. A deoxygenation system comprising:
a catalytic deoxygenation unit located subsea; and
a reducing agent in liquid form located topsides;
the catalytic deoxygenation unit configured to operate at subsea ambient pressure and receive a mixture of a seawater stream containing, oxygen and the reducing agent.

2. A deoxygenation system according to claim 1 wherein the reducing agent is selected from the group consisting of hydrazine, carbohydrazide, sodium erythorbate, methyl ethyl keloxime, hydroquinone, diethylhydroxylamine, and formic acid.

3. A deoxygenation system according to claim 1 further comprising a chemical umbilical arranged to deliver the reducing agent subsea from a topsides source.

4. A deoxygenation system according to claim 1 further comprising a mixer located subsea ahead of the catalytic deoxygenation unit and arranged to receive the seawater stream and the reducing agent.

5. A deoxygenation system according to claim 1 further comprising a filtration system located subsea and arranged to receive the seawater stream.

6. A deoxygenation system according to claim 5 wherein the filtration system includes one or more selectively permeable membranes.

7. A deoxygenation system according to claim 6 wherein the one or more selectively permeable membranes includes a membrane selected from the group consisting of microfiltration, ultrafiltration, nanofiltration, and reverse osmosis.

8. A deoxygenation system according to claim 6 wherein at least one of the one or more selectively permeable membranes is located downstream of the catalytic deoxygenation unit.

9. A deoxygenation system according to claim 1 further comprising a strainer located subsea upstream of the catalytic deoxygenation unit.

10. A deoxygenation system according to claim 1, the reducing agent being hydrazine.

11. A deoxygenation system according to claim 1, the catalytic deoxygenation unit containing a palladium catalyst.

12. A method to deoxygenate a seawater stream subsea, the method comprising:
delivering from topsides to subsea a reducing, agent in liquid form;
mixing the reducing agent with a seawater stream containing oxygen; and
deoxygenating a mixture of the reducing agent and the seawater stream subsea by reacting the reducing agent with the oxygen in the presence of a catalyst in a catalytic deoxygenation unit located subsea;
wherein the catalytic deoxygenation unit is configured to operate at subsea ambient pressure.

13. A method according to claim 12 wherein the reducing agent is selected from the group consisting of hydrazine, carbohydrazide, sodium erythorbate, methyl ethyl ketoxime, hydroquinone, diethylhydroxylamine, and formic acid.

14. A method according to claim 12 further comprising filtering the seawater stream using one or more selectively permeable membranes.

15. A method according to claim 14 wherein the one or more selectively permeable membranes includes a membrane selected from the group consisting of microfiltration, ultrafiltration, nanofiltration, and reverse osmosis.

16. A method according to claim 14 wherein at least one of the one or more selectively permeable membranes is located downstream of the catalytic deoxygenation unit.

17. A method according to claim 12, the reducing agent being hydrazine.

18. A method according to claim 12, the catalytic deoxygenation unit containing a palladium catalyst.

19. A biofouling control, deoxygenation and filtration system comprising:
a biofouling control unit located subsea, the biofouling control unit including chemical dosing means;
a deoxygenation system comprising a catalytic deoxygenation unit located subsea and configured to operate at subsea ambient pressure and receive a seawater stream containing oxygen and a liquid reducing agent, the catalytic deoxygenation unit located downstream of the biofouling control unit and including a palladium catalyst;
a liquid reducing agent source located topsides, the liquid reducing agent being selected from the group consisting of hydrazine, carbohydrazide, sodium erythorbate, methyl ethyl ketoxime, hydroquinone, diethylhydroxylamine, and formic acid;
a chemical umbilical connected to the liquid reducing agent source and the catalytic deoxygenation unit and configured to deliver the liquid reducing agent from the liquid reducing agent source located topsides to the catalytic deoxygenation unit located subsea; and
a filtration system located subsea and including selectively permeable membrane means configured to receive a stream exiting one of the biofouling control unit or the catalytic deoxygenation unit.

* * * * *